Patented Feb. 4, 1941

2,230,233

UNITED STATES PATENT OFFICE 2,230,233

HYDROGENATED INDANE-DIONES AND A METHOD OF PRODUCING THE SAME

Elisabeth Dane, Munich, Germany, assignor to Schering Corporation, Bloomfield, N. J., a corporation of New Jersey No Drawing. Application May 10, 1938, Serial No. 207,061. In Germany May 10, 1937

14 Claims. (Cl. 260—397)

This invention relates to new compounds of the indane-dione series and more particularly to hydrogenated indane-diones and a method of making the same.

Hydrogenated indane-diones have not yet been described in the art. It has been found that according to the present invention their manufacture is possible in an entirely new way by making use of the reaction of Diels and Alder. For this purpose cyclopentene diones are caused to react with compounds containing so-called conjugated double bonds. The combination of cyclopentene diones with such compounds containing conjugated double bonds is carried out in a manner known to the chemist for carrying out the above mentioned "dien" synthesis of Diels and Alder. (Compare, for instance, German Patents 526,168, 521,621, 545,398 and 544,523.)

It could not be foreseen that cyclopentenediones would react with compounds containing conjugated double bonds, for hitherto it was not known that two carbonylic groups in neighbouring position would make a double bond sufficiently capable of reacting with compounds containing conjugated double bonds, i. e. it was not known that these two carbonylic groups would render a double bond "philodienic." Hitherto it was only known that an aldehyde group in neighbouring position to a double bond or two carbonylic groups at the ends of a double bond were necessary to render the double bond philodienic.

According to the present invention as reaction components there may be used not only cyclopentene-1-dione-2,3 but also other compounds of the cyclopentene dione series, for instance, its homologues such as 1-methyl-cyclopentene-1-dione-4,5. Thus, for instance, with methyl-cyclopentene-1-dione-4,5 and butadiene the bicyclo-(0,3,4)-8-methyl-1,2-dioxononen-5 is obtained, that means a hydrogenated indane dione that is substituted at the carbon atom forming the bridge between the 5-membered ring and the 6-membered ring. As the other reaction component containing two conjugated double bonds butadiene may be used. Thus, butadiene and cyclopentene-1-dione-2,3 yield according to this invention tetrahydro indane-dione or more exactly bicyclo-(0,3,4)-1,2-dioxononen-5 in good yield. Hence, in contrast to the hitherto customary methods of building up the indane ring system in the present case the 6-membered ring is attached to an already present 5-membered ring. Instead of butadiene, of course, also other compounds containing conjugated double bonds may be used as the other reaction component. Thus, all those compounds are suitable that have already been subjected to the above mentioned dien synthesis such as substituted butadienes, for instance, isoprene, cyclopenta-dienes, cyclohexa-dienes, phellandrene, myrcene and the like.

Products that are of special interest are obtained, for instance, by combining methyl-cyclo-pentene-dione with 1-vinyl-3,4-dihydronaphthalenes, for instance, with 1-vinyl-3,4-dihydro-6-methoxy-naphthalene whereby indanedione derivatives are obtained that are derived from the cyclopentano phenanthrene ring system present in the well-known sex hormones. Hence, by this method it is possible to produce compounds that have the properties of sexual hormones.

The following example serves to illustrate the invention without, however, limiting the same to it:

3 grams of 1-methyl-cyclopentene-1-dione-4,5 are heated with 4 ccm. of dioxane and 3 ccm. of butadiene in a closed container for 40 hours to 110–130°. Thereafter dioxane and the excess of butadiene are distilled off in a vacuum and the residue is then distilled in a high vacuum of about 0.1 mm. When the bath has reached a temperature of 120° a yellowish oil passes over that on cooling solidifies to crystals. The crystals are twice recrystallised from ether. Colorless cubes of the melting point 120° are obtained which represent tetrahydro-indane-dione. This compound shows with ferric chloride the reddish color reaction of enols.

In the same manner 1-vinyl-3,4-dihydro-6-methoxy-naphthalene yields with methyl-cyclopentene-dione a compound containing a partly hydrogenated cyclopentano - methyl - phenanthrene ring system, that by hydrogenation and saponification can be transformed into an oestriol compound. Instead of the 6-methoxy-naphthalene derivative, of course, other substituted and unsubstituted vinyl-naphthalenes may be used likewise yielding similar products.

Instead of using dioxane another solvent can be employed. Furthermore the reaction conditions, temperature, pressure, duration and the like may be varied according to the nature of the components used as well as to the end-products desired, provided that the principles of the invention as set forth in the specification and in the claims annexed hereto are observed.

What I claim is:

1. A condensation product of a cyclopentene-dione and a compound having a system of conjugated double bonds.

2. A hydrogenated indane-dione compound of the following formula:

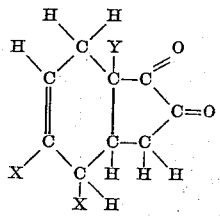

wherein X represents a member of the group consisting of hydrogen, a hydrocarbon radical, and a part of a cyclic hydrocarbon ring system common to both X's, while Y represents a member of the class consisting of hydrogen and alkyl groups.

3. A hydrogenated indane-dione compound of the following formula:

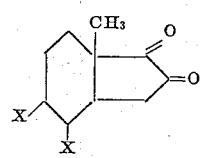

wherein X represents a member of the group consisting of hydrogen, a hydrocarbon radical, and a part of a cyclic hydrocarbon ring system common to both X's.

4. A hydrogenated indane-dione compound of the following formula:

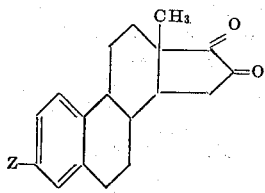

wherein Z represents a member of the class consisting of the hydroxyl group and groups capable of being converted with the aid of hydrolysis into a hydroxyl group.

5. A condensation product of 1-methyl-cyclopentene-1-dione-4,5 and a 1-vinyl-3,4-dihydronaphthalene.

6. A condensation product of 1-methyl-cyclopentene-1-dione-4,5 and a 1-vinyl-3,4-dihydro-6-hydroxy-naphthalene wherein the 6-hydroxy group may be replaced by a group capable of conversion into a hydroxy group.

7. A method of making a hydrogenated indane-dione compound comprising reacting a cyclopentene-dione with a compound containing conjugated double bonds.

8. A method of making a hydrogenated indane-dione compound comprising reacting a cyclopentene-dione with a compound containing conjugated double bond according to the dien synthesis of Diels and Alder.

9. A method according to claim 8 wherein the reaction is carried out in the presence of a solvent.

10. A method according to claim 8 wherein the reaction is carried out by heating the reaction mixture under pressure.

11. A method according to claim 8 wherein the condensation product is isolated by distillation in a high vacuum.

12. A method of making a hydrogenated indane-dione compound comprising reacting methyl-cyclopentene-dione with butadiene.

13. A method of making a hydrogenated indane-dione compound comprising reacting methyl-cyclopentene-dione with a 1-vinyl-3,4-dihydro-naphthalene.

14. A method of making a hydrogenated indane-dione compound comprising reacting methyl-cyclopentene-dione with a 1-vinyl-3,4-dihydro-6-R-naphthalene wherein R is a member of the group consisting of hydroxyl and groups capable of being converted with the aid of hydrolysis into a hydroxy group.

ELISABETH DANE.